(12) United States Patent  
Patterson

(10) Patent No.: US 7,862,292 B2
(45) Date of Patent: Jan. 4, 2011

(54) HORIZONTAL MOTION WAVE POWER GENERATOR

(76) Inventor: Morris D. Patterson, 1610 Winchester Rd., Huntsville, AL (US) 35811

(*) Notice: Subject to any disclaimer, the term of this patent is extended or adjusted under 35 U.S.C. 154(b) by 22 days.

(21) Appl. No.: 12/544,033

(22) Filed: Aug. 19, 2009

(65) Prior Publication Data

US 2010/0047071 A1 Feb. 25, 2010

Related U.S. Application Data

(60) Provisional application No. 61/090,295, filed on Aug. 20, 2008.

(51) Int. Cl.
*F03B 7/00* (2006.01)

(52) U.S. Cl. ............... 415/123; 416/169 R; 416/170 R; 416/172

(58) Field of Classification Search ............ 415/8, 415/123; 416/169 R, 170 R, 172, DIG. 4, 416/DIG. 6; 290/43, 54; 60/507, 498
See application file for complete search history.

(56) References Cited

U.S. PATENT DOCUMENTS

| | | | |
|---|---|---|---|
| 3,259,361 A * | 7/1966 | Cantu ........................ 60/505 |
| 3,687,567 A * | 8/1972 | Lininger ..................... 415/7 |
| 3,911,287 A | 10/1975 | Neville |
| 3,994,629 A | 11/1976 | Tah-sun |
| 4,023,041 A | 5/1977 | Chappell |
| 4,145,885 A | 3/1979 | Solell |
| 4,301,377 A | 11/1981 | Rydz |
| 4,389,843 A * | 6/1983 | Lamberti ................... 60/507 |
| 4,467,218 A | 8/1984 | Andruszkiw et al. |
| 4,539,484 A | 9/1985 | Suggs |
| 4,636,141 A | 1/1987 | Sedlacek |
| 5,105,094 A | 4/1992 | Parker |
| 6,133,644 A | 10/2000 | Smith et al. |
| 6,476,512 B1 | 11/2002 | Rutta |
| 7,076,949 B2 | 7/2006 | Fernandez Gomez et al. |
| 7,315,092 B2 | 1/2008 | Cook |
| 2006/0028026 A1 | 2/2006 | Yim |
| 2006/0232074 A1 | 10/2006 | Chiasson |
| 2008/0084069 A1 | 4/2008 | Lee |

* cited by examiner

*Primary Examiner*—Ninh H Nguyen
(74) *Attorney, Agent, or Firm*—Gerald M. Walsh; Kenneth M. Bush; Bush Intellectual Property Law

(57) ABSTRACT

A paddle wheel-driven horizontal wave generator system which is situated on the ocean shore for converting shore waves to unidirectional rotational force for generating power. By the use of a pair of one-way clutches on a single power shaft the incoming and outgoing motion of ocean waves is converted into continuous unidirectional rotational force to drive an electric generator. The generator system is attached to a base having troughs. The lower portions of the paddle wheels are positioned in the troughs, and engage incoming and outgoing shore waves which rotate the axle of the paddle wheels in a clockwise and counterclockwise direction. The one-way clutches convert the bi-directional rotation of the paddle wheel axle to unidirectional rotation of the power shaft.

5 Claims, 4 Drawing Sheets

INCOMING WAVE

OUTGOING WAVE ated Application

This application claims the benefit of U.S. Provisional Application No. 61/090,295 filed Aug. 20, 2008, the disclosure of which is incorporated herein in its entirety as if fully set forth below.

BACKGROUND OF THE INVENTION

1. Field of the invention

This invention relates generally to devices for generating power from horizontal motion and, more particularly, to an apparatus for generating power from the horizontal motion of incoming and outgoing ocean shore waves.

2. Technical background

Horizontal motion wave power generators for producing electricity from ocean shore waves are known. U.S. Pat. No. 5,105,094 discloses a stationary wave generator that operates by an incoming shore wave moving a piston up and down in a cylinder. The piston engages a drive through a rack and pinion gear system which then engages a unidirectional rotary power shaft. The rack and pinion arrangement is subject to excessive wear. The piston and cylinder need constant maintenance and there needs to be a draining regulation mechanism. The device is useful only for incoming shore waves. Paddle wheel structures are well-known and are particularly useful for capturing the energy of water moving in one direction. As such, they are not suited to capture both the inflow and outflow energy of ocean shore waves. U.S. Pat. No. 6,133,644 discloses a surf driven electrical apparatus which has a shaft on a buoyant body with blades or paddles attached to the shaft. The paddles intercept an incoming ocean wave at a point where the surf breaks and receive the energy produced from the breaking wave, thereby rotating the shaft to operate an electric generator. This device captures the energy only from the incoming motion of the ocean surf.

What is needed, but which has never been available, is a paddle wheel system wherein both the incoming flow and the outgoing flow of the ocean shore waves are converted to unidirectional motion which can drive an electric generator.

SUMMARY OF THE INVENTION

The present invention is a horizontal motion power generator system for converting the incoming and outgoing flow of ocean shore waves to unidirectional rotational force for generating power. The generator system has a base having one or more troughs. An axle is attached rotatably to the base and has one or more paddle wheels attached thereto. The lower portion of the paddle wheel is positioned in the trough so that the paddle wheel engages incoming and outgoing shore waves at the portion of the paddle wheel positioned in the trough. A single power shaft is attached rotatably to the base. First and second one-way clutches are fixed internally to the power shaft. A gear is fixed to the first one-way clutch, the gear is attached rotatably to the power shaft, and the gear engages a reverse gear fixed to the paddle wheel axle. A sprocket is fixed to the second one-way clutch, the sprocket is attached rotatably to the power shaft, and the sprocket engages a sprocket attached to the paddle wheel axle by means of a chain or cable. The second one-way clutch engages the power shaft as the flow of a wave, such as an incoming wave, rotates the paddle wheels in a first direction, thereby rotating the power shaft in a fixed direction, while the first clutch is disengaged from the power shaft. The first one-way clutch engages the power shaft as the flow of a wave, such as an outgoing wave, rotates the paddle wheels in a second opposite direction, thereby rotating the power shaft in the same fixed direction while the second clutch is disengaged from said power shaft. The power shaft is thus rotated in unidirectional manner by the paddle wheels as the paddle wheels rotate in a first direction and in a second opposite direction, thereby providing unidirectional rotational force from incoming and outgoing waves to drive a generator. A transmission with a flywheel is positioned between the power shaft and the generator. The transmission increases the speed of rotation from the power shaft to the generator.

An advantage of the wave motion power generator of the present invention is that it uses a single, simple power shaft to convert the inward and outward horizontal motion of shore waves into continuous unidirectional rotation.

Another advantage is the use of a pair of simple durable one-way clutches on the power shaft to convert inward and outward horizontal motion to unidirectional rotation.

Another advantage is the use of simple durable paddle wheels to capture the energy of horizontal inward and outward motion of shore waves.

Another advantage is a wave motion power generator system that can be scaled up to produce as much power output as desired.

DETAILED DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

A preferred embodiment of the present invention is a paddle wheel driven electric wave generator system or apparatus which is situated on the ocean shore. The system has a power shaft with first and second one-way clutches arranged so that both clutches rotate the power shaft in a first direction when they are rotated in this first direction, but not at the same time. The clutches are disengaged when rotated in a second opposite direction, but not at the same time, in which case they do not rotate the power shaft. The first clutch is attached to a gear which is driven by a reverse gear on the axle of a paddle wheel. The second clutch is attached to a sprocket which is driven by a chain attached to a sprocket on the axle of the paddle wheel. As a shore wave comes in it turns the paddle wheel in a first direction, and the second clutch turns in the first direction which turns the power shaft in the first direction. The first clutch is turned in the opposite second direction and is disengaged. As the shore wave goes out it turns the paddle wheel in the second opposite direction, and the first clutch is turned in the first direction which turns the power shaft in the first direction. The second clutch turns in the opposite second direction and is disengaged. Thus, the inward and outward horizontal flows of the shore waves are converted into unidirectional rotation of the power shaft. The power shaft can be connected to an electric generator through a transmission, thereby producing electric current.

Figure 1:
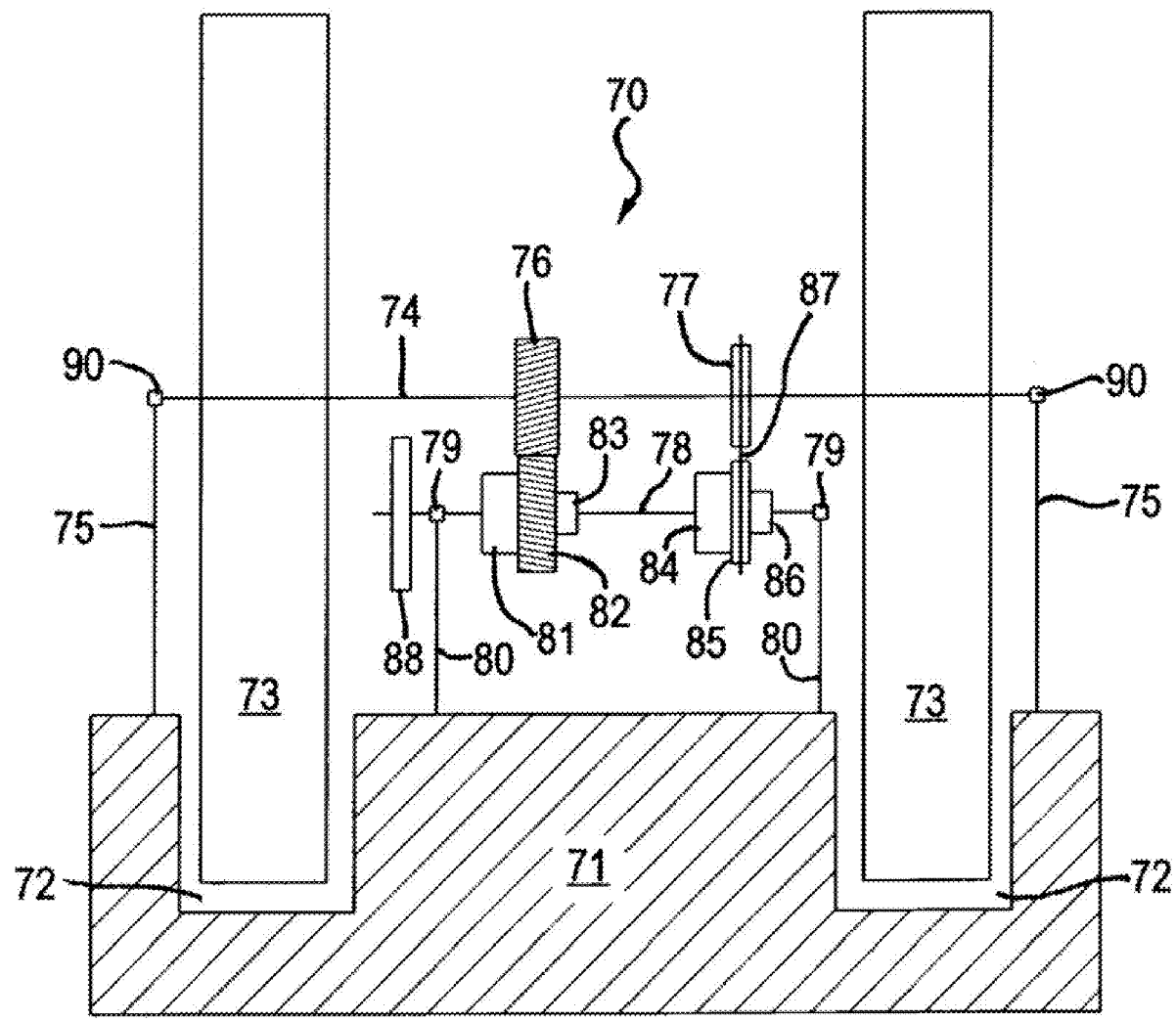
FIG. 1 illustrates the horizontal wave power generating system of the present invention.

FIG. 1 provides a diagrammatic illustration of preferred embodiment of the present invention which can convert the horizontal motion of shore waves into electric energy. The shore wave generator system 70 has a concrete base 71 with troughs 72. Paddle wheels 73 are positioned within troughs 72 and are fixed to a drive axle 74 connected rotatably to vertical supports 75 by means of bearings 90. Vertical supports 75 are fixed to concrete base 71. Axle 74 has a reverse gear 76 and a sprocket 77 which are fixed to axle 74. Adjacent axle 74 is a power shaft 78 connected rotatably to vertical supports 80 by means of bearings 79. Vertical supports 80 are fixed to concrete base 71. In this figure one-way clutches 81, 84 are shown attached to the power shaft 78 in such a way that they engage when rotated clockwise and disengage when rotated counterclockwise, but not at the same time. They can also be attached to work in a reverse manner if desired. A gear 82 is attached to clutch 81. Gear 82 is also attached to a bearing 83, and bearing 83 is attached to power shaft 78. Bearing 83 supports gear 82 on power shaft 78 and allows gear 82 to rotate on power shaft 78. Likewise, attached to clutch 84 is a sprocket 85 attached to bearing 86 which is attached to power shaft 78. Bearing 86 supports sprocket 85 on power shaft 78 allowing sprocket 85 to rotate on power shaft 78. In this manner the gear 82 and sprocket 85 are attached rotatably to power shaft 78 while being attached fixedly to clutches 81 and 84, respectively. Power shaft 78 also has a power pulley 88. Gear 76 on axle 74 engages gear 82 on power shaft 78. Sprocket 77 on axle 74 engages sprocket 85 on power shaft 78 by means of chain or cable 87.

Figure 2:
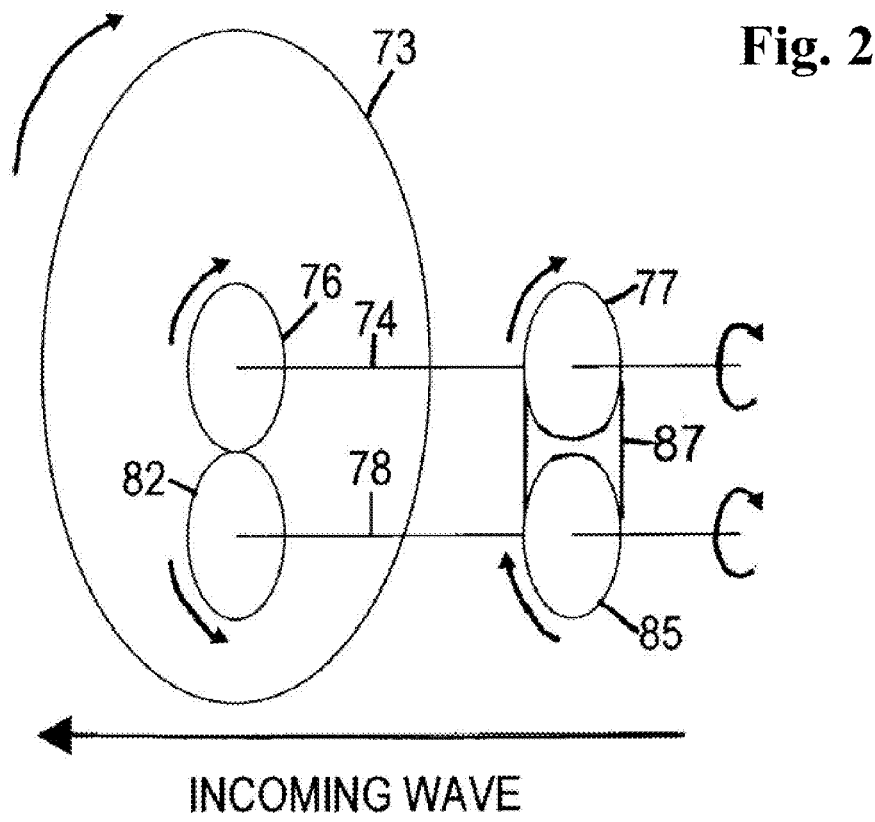
FIG. 2 illustrates how the horizontal wave power generating system converts the back and forth flow of incoming and outgoing ocean shore waves into unidirectional rotation of a power shaft.
Figure 2:
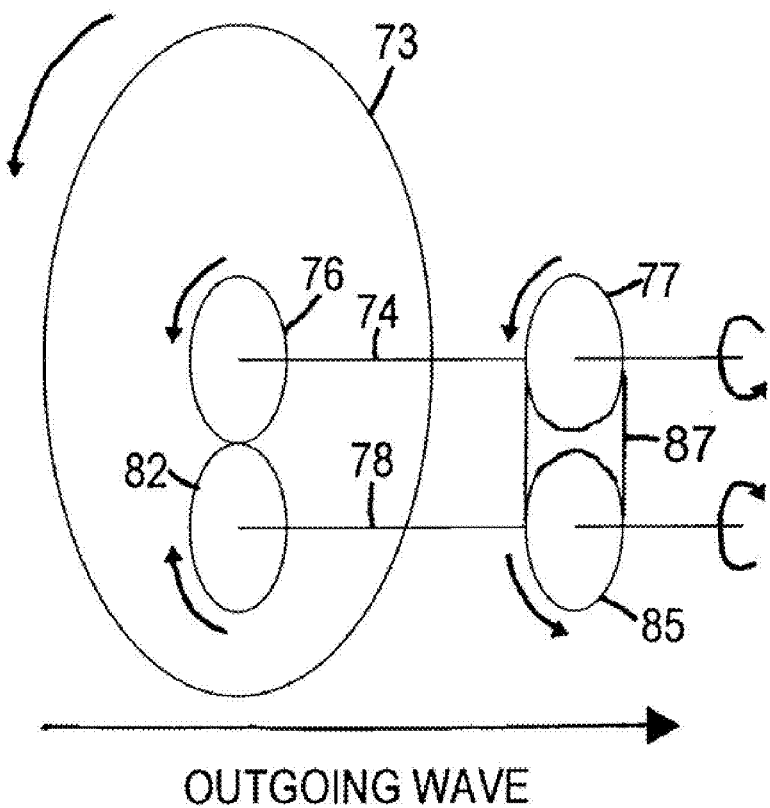

FIG. 2 shows a diagram of how the shore wave generator system 70 (FIG. 1) converts the back and forth horizontal motion of incoming and outgoing shore waves into unidirectional rotation of power shaft 78. With an incoming wave, paddle wheels 73 engage the wave in troughs 72 (FIG. 1), rotate clockwise, and cause axle 74 to rotate clockwise. This causes gear 76 and sprocket 77 to rotate clockwise. As gear 76 rotates clockwise, gear 82 on power shaft 78 rotates counterclockwise, which makes clutch 81 (a first clutch) rotate counterclockwise, thus, disengaging clutch 81 (FIG. 1). As sprocket 77 rotates clockwise, sprocket 85 on power shaft 78 rotates clockwise, which makes a second clutch 84 (FIG. 1) on power shaft 78 rotate clockwise, thus, making power shaft 78 rotate clockwise. With an outgoing wave, paddle wheels 73 engage the wave in troughs 72, rotate counterclockwise, and cause axle 74 to rotate counterclockwise (FIG. 1). This causes gear 76 and sprocket 77 to rotate counterclockwise. As gear 76 rotates counterclockwise, gear 82 on power shaft 78 rotates clockwise. As gear 82 rotates clockwise it makes clutch 81 on power shaft 78 rotate clockwise, thus, making power shaft 78 rotate clockwise. As sprocket 77 rotates counterclockwise, sprocket 85 on power shaft 78 rotates counterclockwise, which makes clutch 84 rotate counterclockwise, thus, disengaging clutch 84. Power shaft 78 can be connected to a transmission by means of power pulley 88 to drive an electric generator, as described below in FIG. 4.

Figure 3:
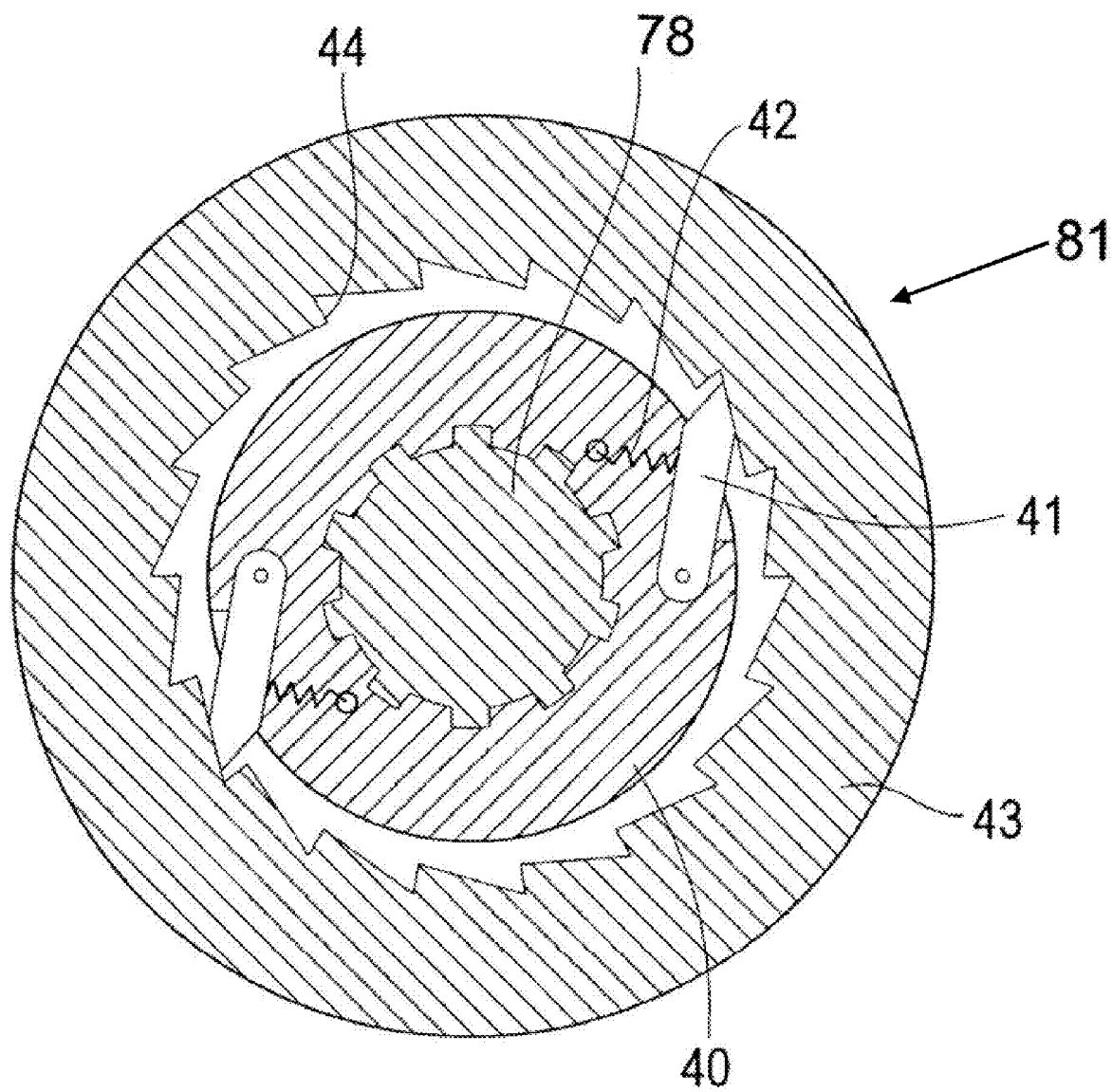
FIG. 3 shows a cross-sectional view of one type of one-way clutch that can be used on the power shaft.

FIG. 3 shows a cross-sectional view of one type of one-way clutch that could be used as clutch 81 or 84. The clutch 81 in this example has a pawl-wheel 40 which is fixed to power shaft 78. Ratchet pawls 41 are attached rotatably to pawl-wheel 40 and are biased away from pawl-wheel 40 by springs 42. Surrounding pawl-wheel 40 is an outer casing 43 having saw-tooth elements 44 on its inner circumference. The gear 82 or sprocket 85 can be fixed to outer casing 43. As the gear or sprocket rotates clockwise the outer casing 43 rotates clockwise. As the outer casing 43 rotates clockwise the saw-teeth 44 engage the ratchet-pawls 41, causing the power shaft 78 to rotate clockwise. As the sprocket rotates counterclockwise the outer casing 43 rotates counterclockwise. As the outer casing 43 rotates counterclockwise the saw-teeth 44 slip freely over the ratchet-pawls 41, causing the clutch to be disengaged and no rotational force is applied to power shaft 78. The one-way clutch can be configured to operate in a reverse manner.

Figure 4:
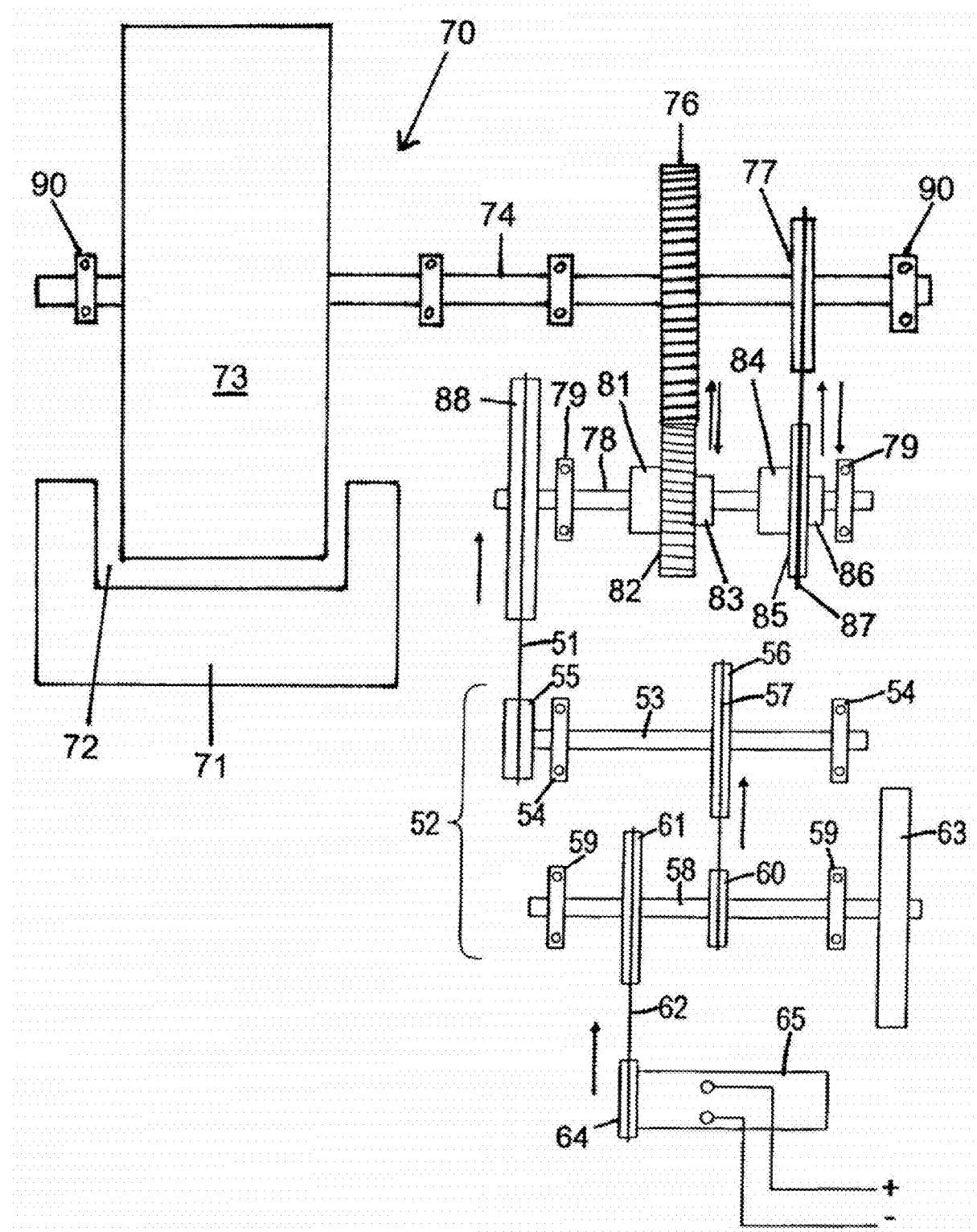
FIG. 4 shows an example of a transmission that can be used to increase the speed of rotation from the power shaft to an electric generator.

FIG. 4 shows an example of how power shaft 78 can be connected to an electric generator 65 by means of a transmission 52 to increase the speed of rotation from the power shaft 78 to the electric generator 65. Power shaft 78 can have a large power pulley 88 which transmits the unidirectional rotational force of power shaft 78 to a smaller first pulley 55 on a first shaft 53 of transmission 52 by means of belt 51. First shaft 53 is held in place on concrete base 71 by bearings 54 (see FIG. 1). First shaft 53 has a large pulley 56 which transmits the unidirectional rotational force to a smaller second pulley 60 on a second shaft 58 of transmission 52 by means of belt 57. Second shaft 58 is held in place on concrete base 71 by bearings 59 (see FIG. 1). Second shaft 58 can have a flywheel 63 to maintain a constant rotation of shaft 58. Shaft 58 also has a large pulley 61 which transmits the unidirectional rotational force to a smaller pulley 64 on an electric generator 65 by means of belt 62. Thus, as power shaft 78 is made to rotate clockwise at about 5 to 10 times per minute, depending upon the frequency of shore waves moving inward and outward, transmission 52 can make electric generator 65 turn at speeds as high as 2000 rpm.

The foregoing description has been limited to specific embodiments of this invention. It will be apparent; however, that variations and modifications may be made by those skilled in the art to the disclosed embodiments of the invention, with the attainment of some or all of its advantages and without departing from the spirit and scope of the present invention. For example, the horizontal motion wave power generator 70 (FIG. 1) of the present invention can be scaled up to any desirable size. As many paddle wheels as desired can be attached to a power shaft. Other types of one-way clutches can be used, such as Sprague clutches and Reynolds clutches. The horizontal motion wave power generator can generate pressure power in addition to electric power. The paddle wheels 73 and the base 71 can be constructed of any suitable materials, including metals, plastics, wood, or a combination thereof.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. An apparatus for converting the horizontal incoming and outgoing motion of shore waves to unidirectional rotational force for generating power, comprising:
   a) a base;
   b) an axle attached rotatably to said base, said axle having one or more paddle wheels attached thereto;
   c) a single power shaft attached rotatably to said base;
   d) first and second one-way clutches fixed to said power shaft;

e) a gear fixed to said first one-way clutch, said gear attached rotatably to said power shaft, and said gear engaging a reverse gear fixed to said axle;

f) a sprocket fixed to said second one-way clutch, said sprocket attached rotatably to said power shaft, and said sprocket engaging a sprocket attached to said axle;

g) said second one-way clutch engaging said power shaft as the flow of a wave rotates said paddle wheels in a first direction, thereby rotating said power shaft in a fixed direction while said first clutch is disengaged from said power shaft;

h) said first clutch engaging said power shaft as the flow of a wave rotates said paddle wheels in a second opposite direction, thereby rotating said power shaft in said fixed direction while said second clutch is disengaged from said power shaft; and i) said power shaft rotated in said fixed direction by said paddle wheels as said paddle wheels rotate in a first direction and in a second opposite direction, thereby providing unidirectional rotational force to said power shaft from incoming and outgoing waves to drive a generator.

2. The apparatus of claim 1 further comprising said base having troughs, a portion of said paddle wheels being positioned in said troughs, and said paddle wheels engaging incoming and outgoing shore waves at said portions of said paddle wheels positioned in said troughs.

3. The apparatus of claim 2 further comprising a transmission with a flywheel positioned between said power shaft and said generator, wherein said transmission increases the speed of rotation from said power shaft to said generator.

4. An apparatus for converting the horizontal incoming and outgoing motion of shore waves to unidirectional rotational force for generating power, comprising:

a) a base having one or more troughs;

b) an axle attached rotatably to said base, said axle having one or more paddle wheels attached thereto, a portion of said paddle wheels being positioned in said troughs, and said paddle wheels engaging incoming and outgoing shore waves at said portions of said paddle wheels positioned in said troughs;

c) a single power shaft attached rotatably to said base;

d) first and second one-way clutches fixed to said power shaft;

e) a gear fixed to said first one-way clutch, said gear attached rotatably to said power shaft, and said gear engaging a reverse gear fixed to said axle;

f) a sprocket fixed to said second one-way clutch, said sprocket attached rotatably to said power shaft, and said sprocket engaging a sprocket attached to said axle;

g) said second one-way clutch engaging said power shaft as the flow of a wave rotates said paddle wheels in a first direction, thereby rotating said power shaft in a fixed direction while said first clutch is disengaged from said power shaft;

h) said first clutch engaging said power shaft as the flow of a wave rotates said paddle wheels in a second opposite direction, thereby rotating said power shaft in said fixed direction while said second clutch is disengaged from said power shaft; and i) said power shaft rotated in said fixed direction by said paddle wheels as said paddle wheels rotate in a first direction and in a second opposite direction, thereby providing unidirectional rotational force to said power shaft from incoming and outgoing waves to drive a generator.

5. The apparatus of claim 4 further comprising a transmission with a flywheel positioned between said power shaft and said generator, wherein said transmission increases the speed of rotation from said power shaft to said generator.

* * * * *